United States Patent [19]
Alouges

[11] 3,925,794
[45] Dec. 9, 1975

[54] DEVICE FOR TAKING SEQUENCES OF AERIAL PHOTOGRAPHS

[75] Inventor: Aime Elie Alouges, Evry, France

[73] Assignee: Centre National d'Etudes Spatiales, Paris, France

[22] Filed: Jan. 17, 1974

[21] Appl. No.: 434,135

[30] Foreign Application Priority Data
Jan. 17, 1973 France .................... 73.01611

[52] U.S. Cl. .................................................. 354/70
[51] Int. Cl.² ........................................ G03B 29/00
[58] Field of Search ........................... 354/65–74

[56] References Cited
UNITED STATES PATENTS

| | | | |
|---|---|---|---|
| 894,348 | 7/1908 | Seele | 354/74 |
| 1,731,776 | 10/1929 | Henry | 354/70 |
| 2,273,876 | 2/1942 | Lutz | 354/72 |
| 2,967,470 | 1/1961 | Willits | 354/66 |
| 3,092,687 | 6/1963 | Cannon | 354/70 |
| 3,523,660 | 8/1970 | Attebery | 354/74 |
| 3,638,502 | 2/1972 | Leavitt | 354/70 |
| 3,715,962 | 2/1973 | Yost | 354/68 |

Primary Examiner—John M. Horan
Attorney, Agent, or Firm—Wigman & Cohen

[57] ABSTRACT

Aerial photography device fixed to a nacelle, operating suspended beneath a balloon and comprising one or more photographic apparatuses directed towards the ground when the nacelle is suspended from the balloon by a connection element, an intervalometer for instituting the successive photographs and an element governing the orientation of the nacelle about an axis passing through the connection element, the nacelle being stabilised in relation to the magnetic meridian during short time intervals immediately preceding the shots, after which the taking of each photograph is instigated.

12 Claims, 5 Drawing Figures

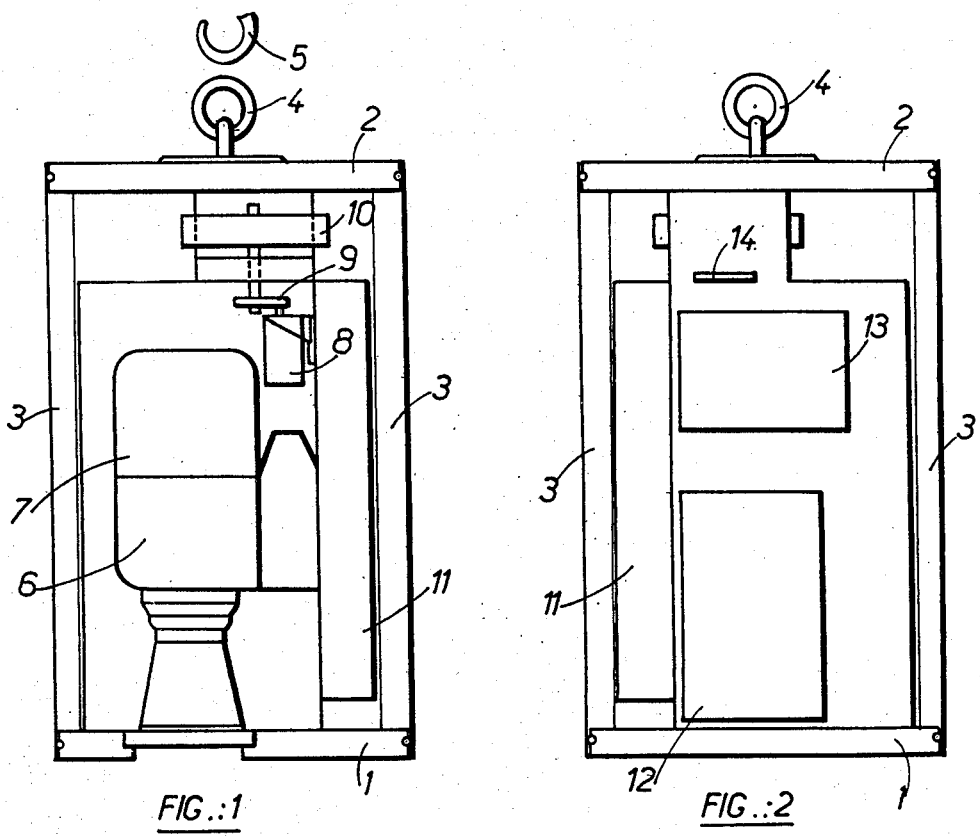
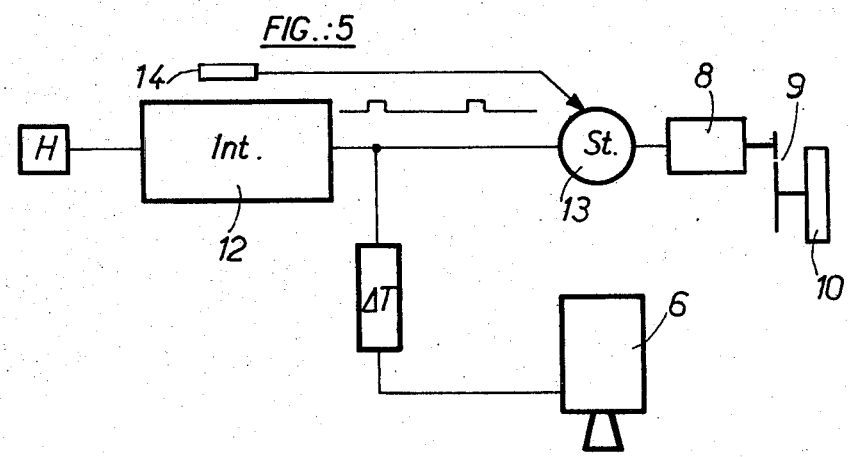

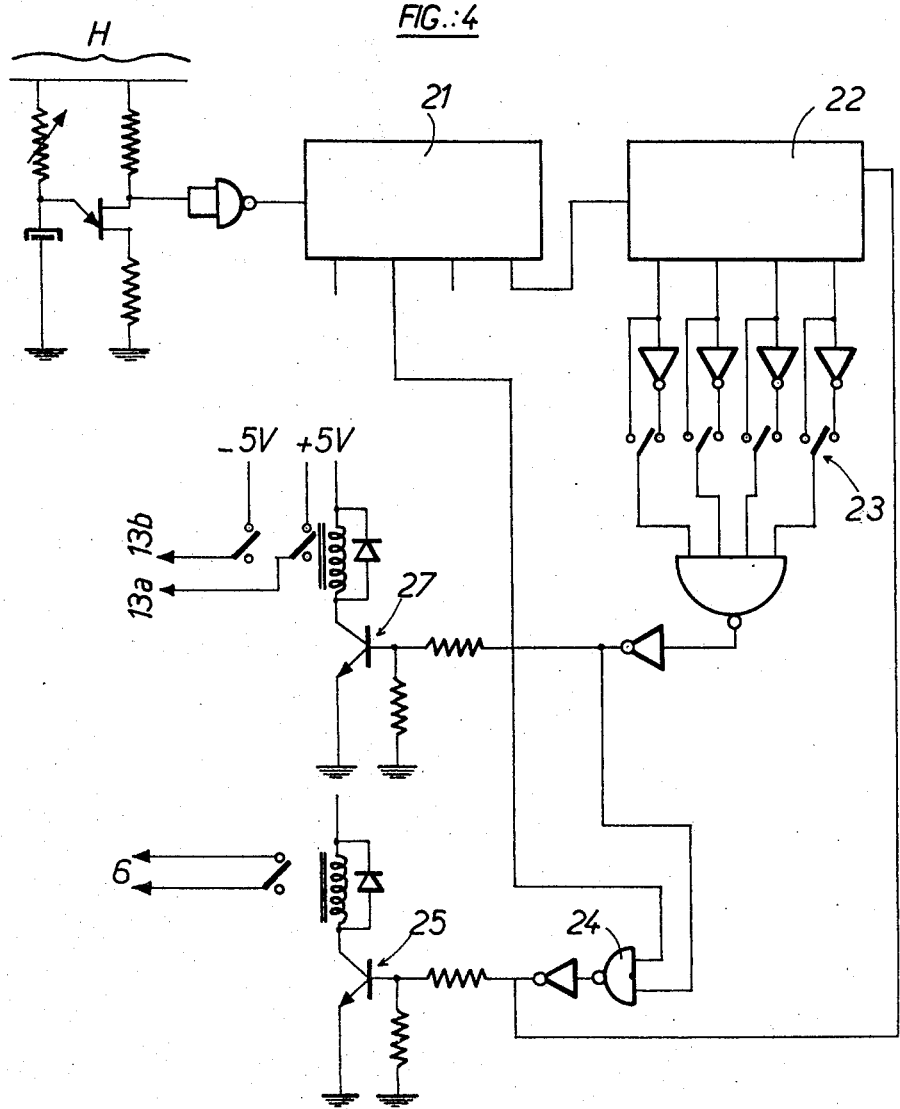
FIG.:4

DEVICE FOR TAKING SEQUENCES OF AERIAL PHOTOGRAPHS

BACKGROUND OF THE INVENTION

The present invention, concerning photography, relates more specifically to a device serving for taking sequences of aerial photographs, especially from a balloon nacelle.

For taking aerial photographs which can subsequently be usefully exploited for multiple purposes, it is possible to operate from aircraft flying at high altitude, which poses many problems for the realisation of the device, or from balloons, for example, stratospheric balloons, which is easier to realise; it is to this latter type of device that the invention relates.

The existing devices intended to operate when suspended beneath the nacelle of a balloon possess a number of disadvantages, especially: they are heavy (approximately 220 kg), bulky and very costly. Their high weight is especially due to the basic arrangement in accordance with which they are equipped with means ensuring a permanent rotation or rotatability.

To this end it is provided that they are suspended from the nacelle by a vertical pivot, which in itself presents difficulties, since the pivot must be sturdy and designed to operate under severe environmental conditions (low temperature and high vacuum) and the device must be well balanced in order to rotate about the pivot; moreover, it follows that the device must in particular include orientation and aiming systems (motor, inertia flywheel) which are in themselves heavy and bulky, and large means (batteries) must be provided which are capable of permanently feeding the device in the course of flight, which means likewise will be heavy and bulky. The magnitude of the weight of the whole device has an irksome repercussion upon the cost of the whole of the equipment, since for convenience of operations in fact two balloons must be provided for the launch, the auxiliary balloon being released at a certain altitude.

With these existing devices the taking of the photographs is controlled directly by an incorporated local clock. As the orientation of the nacelle varies from one photograph to the next, generally a sequence of differently orientated overlapping photographs is obtained, which no longer permits of stereoscopic interpretation.

SUMMARY OF THE INVENTION

The invention has the purpose of remedying the drawbacks which have just been indicated, that is to say it aims at realising a device which is appreciably lighter (approximately 12 kg) than the existing ones and is less bulky and cheaper than these (it can be of the order of 10 times cheaper) and which further permits the producing of a sequence of photographs having one and the same orientation and permitting stereoscopic observation. Further advantages will also appear from the description: robustness, simplicity, etc.

It has been possible to obtain this improvement mainly by virtue of the limitation of to effecting a reorientation of the apparatus at periodically repeated short time intervals. For this purpose the nacelle can be suspended through the intermediary of a pivot without any limitation to the rotation. However, for reasons of cost the device has been designed so that it can operate without a pivot, for example and preferably with the aid of a hook or an analogous arrangement.

Under the effect of the wind the balloon is subjected to torques which cause relative rotation between the balloon and nacelle at a rate of several degrees per second. The permanent aiming of a nacelle in a fixed direction (magnetic field for example) is thus translated by an increasing twisting of the suspension rope. It is then necessary to provide a pivot the purpose of which is to rotationally isolate the nacelle from the balloon. On the other hand, if the aiming of the nacelle is sought only during brief moments separated by sufficient intervals, it becomes possible to reorientate it by applying a torque which twists the suspension rope by a half revolution at the maximum, which torque is supplied by an inertia wheel driven by a motor.

In a more precise manner, within the scope of the invention, the orientation of the nacelle is sought only at the moment of taking each photograph, which permits a great simplification of its elements and thus a major reduction of weight with correlatively a correct orientation of the successive negatives.

It is quite clear that the use of a pivot, the present cost of which would be high, to effect correct operation under the severe conditions at high altitude remains possible.

The combination of these characteristics permits of realising a particularly effective and advantageous device.

Thus the aerial photography device, situated in a nacelle which operates suspended beneath a balloon and comprises one or more photographic apparatuses directed towards the ground when the device is suspended from the balloon, a connection element between the balloon and the nacelle, a time control apparatus including a clock for the simultaneous instigation of the taking of successive photographs on one or all of the photographic apparatuses and an element controlling the orientation of the apparatus about a vertical axis passing through the connection element, comprises in association an intervalometer which permits the sequence of successive photographs, magnet means for marking the orientation of the nacelle by guide marks in relation to the direction of the magnetic field of the Earth and means for initiating each exposure when a predetermined orientation is reached.

In the case where the device according to the invention comprises several photographic apparatuses, it will be proposed to obtain photographs in different wavelength bands. This means that each of the emulsions corresponding to the photographic apparatuses under consideration is sensitive to different wavelength bands, such as black and white, colour, infra-red, infrared colour. This technique permits the analysing of the terrain in a more thorough and complete manner.

BRIEF DESCRIPTION OF THE DRAWINGS

The invention will now be further described, by way of example, with reference to the accompanying drawings, in which:

FIG. 1 is the front view of a device according to the invention;

FIG. 2 is the rear view thereof;

FIG. 4 is the diagram of the order generator and;

FIG. 5 is the basic diagram of the device.

DESCRIPTION OF PREFERRED EMBODIMENTS

Figure 3:
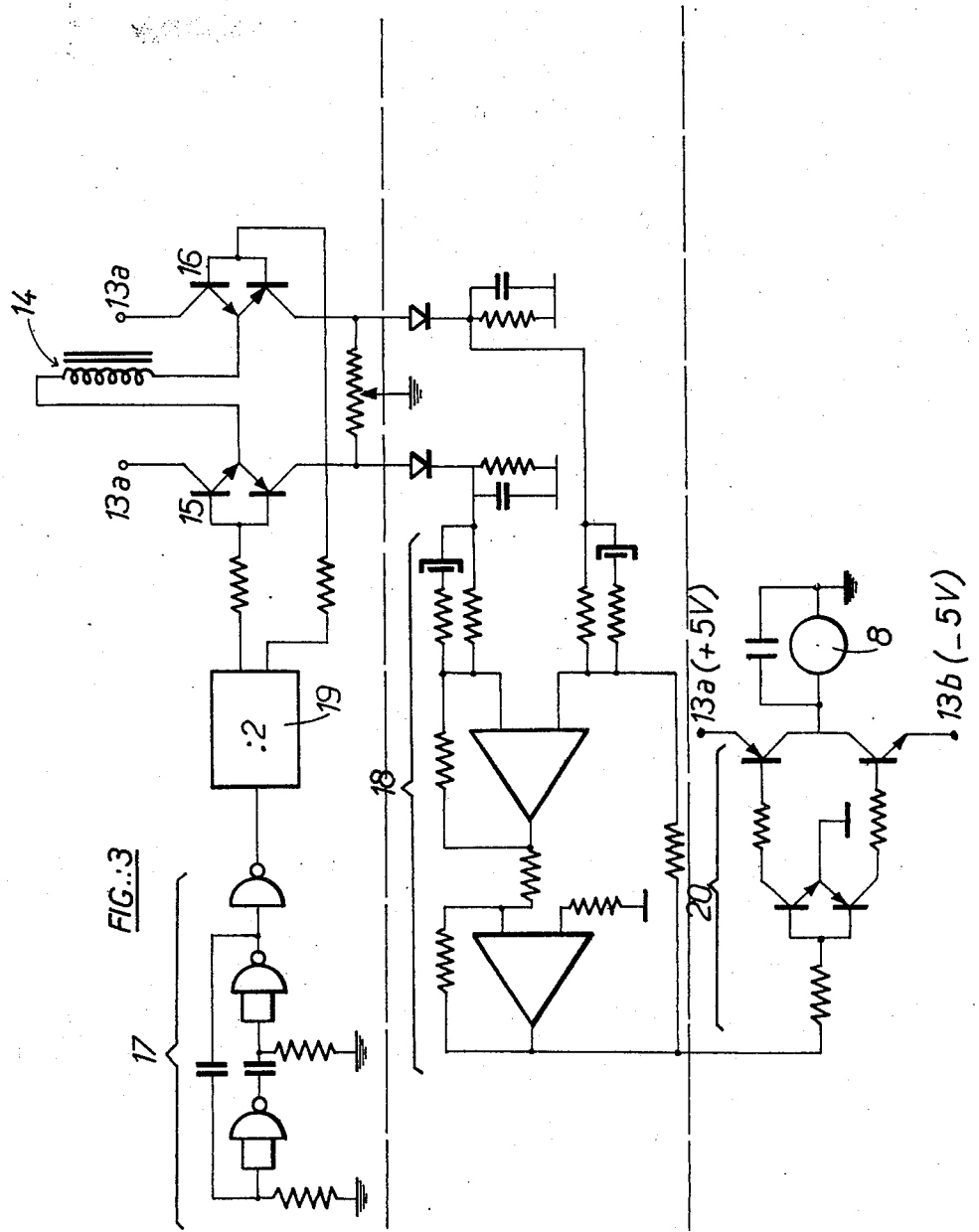
FIG. 3 is the diagram of the stabilisation box.

FIGS. 1 and 2 show an example of the device according to the invention. This device is mounted on a nacelle constituted by a base frame or plate 1 united with an upper frame or plate 2 through uprights 3 to form a rigid entity, intended to be suspended by a stout ring 4 on a hook 5 which connects the element with the balloon.

The device comprises essentially:

at least one photographic apparatus 6 intended to take successive multiple shots, being controlled to this end by an electric control (for example a Hasselblad camera type 500 EL/70); the apparatus or apparatuses is or are mounted vertically, their downwardly directed lenses are opposite to one or more corresponding openings in the plate 1. In the upper part each apparatus comprises a negative magazine 7;

a low-power motor 8 (for example consuming 3 amp. at 5 V under full load);

a reduction gearing 9 driven by the motor;

an inertia flywheel 10 (serving for stabilisation);

a battery 11 (in this case a light battery or accumulator of 5 V);

an order generator 12;

a stabilisation control "box" 13; and a magnetometer pickup 14.

Several of these elements are also to be seen in FIG. 5. The intervalometer or order generator 12, including a clock H controlling it, supplies control pulses to a stabiliser device 13 at time intervals which are prefixed before the departure of the balloon. These control pulses are very short; 5 seconds are sufficient but to have a certain safety margin one can adopt 15 seconds. During this pulse the orientation of the apparatus is compared with that given by the magnetometer pickup 14 and the stabilisation is controlled by the motor 8, the reduction gearing 9 and the inertia flywheel 10 until the orientation of the device coincides with that selected, for example due east, the device pivoting for this purpose by virtue of the twisting of the suspension rope. At the end of a delay T which is sufficient so that the stabilisation may be ensured, for example 10 or 20 seconds, designated by $\Delta T$ in FIG. 5, the taking of the photograph is tripped.

The taking of the following photograph is effected in the same way; the motor 8 being of the reversible type, it can impart the suitable direction for the orientation to the inertia wheel.

In FIG. 3 the supply and stabilisation circuits are represented in detail. A multi-vibrator 17 supplies a rectangular signal the frequency of which is approximately 50 kHz. A halving divider 19 brings this frequency to 25 kHz. The reason for the existence of this divider is to ensure a cylic ratio strictly equal to 1 for the signal driving the circuit of the magnetometric pickup 14, which supplies the continuous differential tension depending upon the magnetic field. A phase advance circuit 18 ensures damping and stability of the servo-system. A continuous amplifier 20 supplies the motor 8.

A circuit of the order generator is seen in FIG. 4. The clock H drives a first divider 21 (divided by 16) followed by a second divider 22 (also by 16). By reason of the action of a multiple switch 23 it is possible to select the suitable output of the divider 22 to determine the interval corresponding best to the wind speed at the moment of launching of the balloon, or in other words the recurrence frequency of the intervalometer.

A circuit 27 controls a relay which sets the stabilisation box (13a, 13b) in operation. An AND cell 24 controls a circuit 25 which trips the shooting of camera 6, with a certain delay taken from the divider 21.

Of course, the device as illustrated and discussed above is only an example and within the scope of the invention it is possible to replace elements by other technically equivalent elements. In particular the magnetometer pickup can be replaced by any equivalent element (compass) sensitive to the direction of the magnetic field of the Earth, according to its horizontal component.

Further variants are also possible while remaining within the scope of the invention, for example:

When the intervalometer indicates the moment of shooting the stabilisation device is set in action and the actuation of the photographic apparatus is caused as soon as the magnetometer detects the alignment of the nacelle upon the magnetic field of the Earth.

Alternatively when the intervalometer indicates the moment of shooting, the stabilisation device is set in action for 15 seconds, the actuation of the photographic apparatus then being caused by the magnetometer on alignment of the nacelle.

For this purpose it is sufficient to modify the connection circuits accordingly between the same fundamental components.

What is claimed is:

1. In combination with an aerial photography device fixed to a nacelle, and having at least one photographic apparatus arranged to be directed towards the ground when the nacelle is suspended from a balloon, a connection element for connecting the balloon with the nacelle, an element for controlling the taking of photographic exposures by the or each photographic apparatus and a mechanism for orienting the device about a vertical axis; an intervalometer for controlling the sequence of successive photographic exposures, a magnetometer for detecting the angular orientation of the nacelle in relation to the direction of the magnetic field of the Earth and means under control of the intervalometer and the magnetometer for initiating a photographic exposure taken by the or each photographic apparatus when a predetermined angular orientation is reached.

2. The combination claimed in claim 1, wherein said connection element comprises a suspension rope adapted to be twisted by the flow of atmospheric air around the balloon and nacelle and thus cause a swinging pivoting movement of the nacelle with a limited amplitude.

3. The combination claimed in claim 1, wherein the said connection element comprises a hook and ring attachment system for supporting both the nacelle and the device.

4. The combination claimed in claim 1, wherein the intervalometer is equipped with a set of switches for selectively fixing the recurrence frequency thereof within predetermined limits.

5. The combination claimed in claim 1, including a plurality of photographic apparatus directed towards the ground, said intervalometer being connected to each apparatus for initiating the taking of simultaneous photographic exposures by said apparatus.

6. In combination with an aerial photography device fixed to a nacelle, and having at least one photographic apparatus arranged to be directed towards the ground when the nacelle is suspended from a balloon, a connection element for connecting the balloon with the nacelle, an element for controlling the taking of photographic exposures by the or each photographic apparatus and a mechanism for orienting the device about a vertical axis; an intervalometer for controlling the sequence of successive photographic exposures, a magnetometer for detecting the angular orientation of the nacelle in relation to the direction of the magnetic field of the Earth, and stabilization means for stabilizing the angular orientation of the nacelle in relation to the magnetic meridian during a short time lapse and for then controlling the taking of the photographic exposure when the said angular orientation is obtained towards the end of said time lapse, said stabilization means being under control of said intervalometer and said magnetometer, said stabilization means further including electric circuit means for initiating said photographic exposure when said angular orientation is reached.

7. The combination claimed in claim 6, wherein the magnetometer is sensitive to the direction of the magnetic field of the Earth, and wherein said stabilization means includes a motor driving an inertia wheel attached to the nacelle, and circuits interconnecting the magnetometer and the motor for transmitting the voltage supplied by the magnetometer to said motor.

8. The combination claimed in claim 7, further comprising timing means controlled by the intervalometer whereby the said interconnecting circuits are energized only during a short time interval.

9. In combination with an aerial photography device fixed to a nacelle, and having at least one photographic apparatus arranged to be directed towards the ground when the nacelle is suspended from a balloon, a connection element for connecting the balloon with the nacelle, an element for controlling the taking of photographic exposures by the or each photographic apparatus and a mechanism for orienting the device about a vertical axis; an intervalometer for controlling the sequence of successive photographic exposures, a magnetometer for detecting the angular orientation of the nacelle in relation to the direction of the magnetic field of the Earth, stabilization means for temporarily stabilizing the angular orientation of the nacelle, and control means including electric circuit means connected to the intervalometer and the magnetometer for controlling the operation of said stabilization means and for causing the operation of the or each photographic apparatus to take a photographic exposure as soon as the desired angular orientation is reached.

10. The combination claimed in claim 9, wherein the magnetometer is sensitive to the direction of the magnetic field of the Earth, and wherein said stabilization means includes a motor driving an inertia wheel attached to the nacelle, and circuits interconnecting the magnetometer and the motor for transmitting the voltage supplied by the magnetometer to said motor.

11. In combination with an aerial photoggraphy device fixed to a nacelle, and having at least one photographic apparatus arranged to be directed towards the ground when the nacelle is suspended from a balloon, a connection element for connecting the balloon with the nacelle, an element for controlling the taking of photographic exposures by the or each photographic apparatus and a mechanism for orienting the device about a vertical axis; an intervalometer for controlling the sequence of successive photographic exposures, a magnetometer for detecting the angular orientation of the nacelle in relation to the direction of the magnetic field of the Earth, stabilization means for stabilizing the orientation of the nacelle during a short time lapse, and control means including electric circuit means for controlling by the intervalometer the operation of the stabilization means and the operation of the or each photographic apparatus under concomitant control of the magnetometer as soon as a predetermined angular orientation is reached and when the nacelle is stabilized.

12. An aerial photography device adapted to be suspended from a balloon comprising:
a nacelle;
means for connecting the nacelle to the balloon;
photographic means fixed to the nacelle and arranged to be directed toward the ground for taking photographic exposures;
intervalometer means for controlling a timed sequence of successively taken photographic exposures;
a magnetometer for detecting the angular orientation of the nacelle relative to the direction of the magnetic field of the Earth;
stabilization means for intermittently stabilizing the angular orientation of the photographic means about a vertical axis; and
means for operating said photographic means to take a photographic exposure, said operating means being controlled by said intervalometer and said magnetometer for taking one of said sequence of successively taken photographic exposures each time said stabilization means achieves a predetermined angular orientation of the nacelle relative to the direction of the magnetic field of the Earth.

* * * * *

UNITED STATES PATENT AND TRADEMARK OFFICE
CERTIFICATE OF CORRECTION

PATENT NO. : 3,925,794
DATED : December 9, 1975
INVENTOR(S) : Aime Elie Alouges

It is certified that error appears in the above–identified patent and that said Letters Patent are hereby corrected as shown below:

In the Abstract, line 7, change "instituting" to --instigating--;

Column 1, line 61, before "effecting" delete "to".

Signed and Sealed this fifteenth Day of June 1976

[SEAL]

Attest:

RUTH C. MASON
Attesting Officer

C. MARSHALL DANN
Commissioner of Patents and Trademarks